United States Patent
Maimin et al.

(10) Patent No.: US 9,278,611 B2
(45) Date of Patent: *Mar. 8, 2016

(54) ROLL UP PICK-UP TRUCK BOX COVER WITH LOCK DOWN SLATS

(71) Applicant: Laurmark Enterprises, Inc., Ann Arbor, MI (US)

(72) Inventors: Israel Maimin, San Fernando, CA (US); Julian Maimin, San Fernando, CA (US)

(73) Assignee: Laurmark Enterprises, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/590,121

(22) Filed: Jan. 6, 2015

(65) Prior Publication Data

US 2015/0108784 A1      Apr. 23, 2015

Related U.S. Application Data

(63) Continuation of application No. 14/011,523, filed on Aug. 27, 2013, now Pat. No. 8,939,494, which is a continuation of application No. 13/653,766, filed on Oct. 17, 2012, now Pat. No. 8,544,934.

(Continued)

(51) Int. Cl.
*B60P 7/02*  (2006.01)
*B60J 7/08*  (2006.01)
*B60J 7/10*  (2006.01)
*B60J 7/185* (2006.01)

(52) U.S. Cl.
CPC  *B60J 7/085* (2013.01); *B60J 7/102* (2013.01); *B60J 7/1856* (2013.01); *B60P 7/02* (2013.01)

(58) Field of Classification Search
CPC ............ B60J 7/02; B60J 7/085; B60J 7/1856; B60J 7/102
USPC .................. 296/100.09, 100.07, 100.12, 219, 296/100.16; 160/133, 243
See application file for complete search history.

(56) References Cited

U.S. PATENT DOCUMENTS

| | | |
|---|---|---|
| 2,771,319 A | 11/1956 | Renquist |
| 4,210,361 A | 7/1980 | Marvin et al. |
| 4,216,990 A | 8/1980 | Musgrove et al. |
| 4,313,636 A | 2/1982 | Deeds |
| 4,784,427 A | 11/1988 | Burgess |
| 4,795,206 A | 1/1989 | Adams |

(Continued)

OTHER PUBLICATIONS

RollBak Aluminum Retractable Tonneau Covers brochure (Nov. 2003).

(Continued)

*Primary Examiner* — Dennis H Pedder
(74) *Attorney, Agent, or Firm* — Harness, Dickey & Pierce, PLC

(57) ABSTRACT

A cover assembly for a vehicle box having a plurality of slats with each slat pivotally connected to at least one adjacent slat and end fittings attached to opposite ends of each of the plurality of slats. Side rails are attachable to the vehicle box. Locking elements associated with each side rail are movable to engage and hold the end fittings onto the side rails. The locking element including a hook on a roll rod pivotally positioned within an arc section of the side rail. The roll rod is movable from a first position wherein the hook projects into a slot in the end fittings to a second position wherein the hook is withdrawn from the slot.

15 Claims, 18 Drawing Sheets

Related U.S. Application Data

(60) Provisional application No. 61/553,828, filed on Oct. 31, 2011, provisional application No. 61/553,885, filed on Oct. 31, 2011, provisional application No. 61/553,814, filed on Oct. 31, 2011, provisional application No. 61/602,280, filed on Feb. 23, 2012, provisional application No. 61/621,921, filed on Apr. 9, 2012.

(56) References Cited

U.S. PATENT DOCUMENTS

| | | |
|---|---|---|
| 4,807,921 A | 2/1989 | Champie, III et al. |
| 4,889,381 A | 12/1989 | Tamblyn et al. |
| 4,946,217 A | 8/1990 | Steffens et al. |
| 5,040,843 A | 8/1991 | Russell et al. |
| 5,074,188 A | 12/1991 | Harris |
| 5,251,950 A | 10/1993 | Bernardo |
| 5,253,694 A | 10/1993 | Bernardo |
| 5,330,246 A | 7/1994 | Bernardo |
| 5,350,213 A | 9/1994 | Bernardo |
| 5,427,428 A | 6/1995 | Ericson et al. |
| 5,636,893 A | 6/1997 | Wheatley et al. |
| 5,795,011 A | 8/1998 | Flentge |
| D403,292 S | 12/1998 | Bogard |
| 5,857,729 A | 1/1999 | Bogard |
| 6,030,021 A | 2/2000 | Ronai |
| 6,076,881 A | 6/2000 | Tucker |
| 6,082,806 A | 7/2000 | Bogard |
| 6,113,176 A | 9/2000 | Bernardo |
| 6,126,225 A | 10/2000 | Griffin |
| 6,126,226 A | 10/2000 | Wheatley |
| 6,217,102 B1 | 4/2001 | Lathers |
| 6,340,194 B1 | 1/2002 | Muirhead et al. |
| 6,422,635 B1 | 7/2002 | Steffens et al. |
| 6,454,337 B2 | 9/2002 | Steffens et al. |
| 6,565,141 B1 | 5/2003 | Steffens et al. |
| 6,827,389 B1 | 12/2004 | Pandorf |
| 6,899,372 B1 | 5/2005 | Keller |
| 7,021,693 B2 | 4/2006 | Keller |
| 7,066,523 B2 | 6/2006 | Verduci et al. |
| 7,445,264 B2 | 11/2008 | Spencer et al. |
| 7,604,282 B2 | 10/2009 | Spencer et al. |
| 7,828,361 B1 | 11/2010 | Spencer |
| 8,182,021 B2 | 5/2012 | Maimin et al. |
| 8,939,494 B2 | 1/2015 | Maimin et al. |
| 2003/0197394 A1 | 10/2003 | Dimmer |
| 2004/0245799 A1 | 12/2004 | Rusu |
| 2009/0243331 A1 | 10/2009 | Spencer et al. |

OTHER PUBLICATIONS

RollBak install instructions (Jan. 2005).
RollBak G2 brochure (Oct. 2007).
RollBak brochure (Dec. 2007).

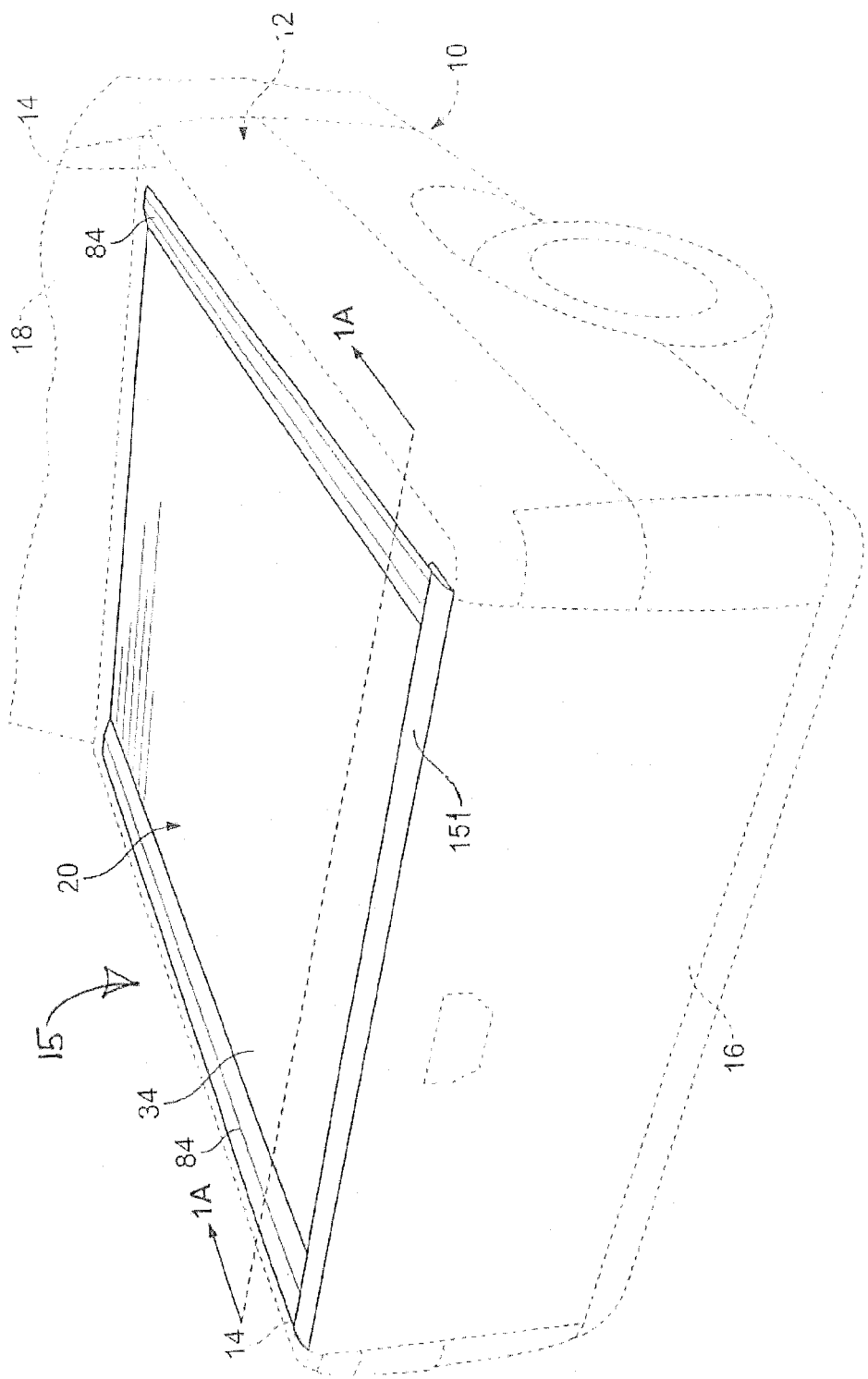

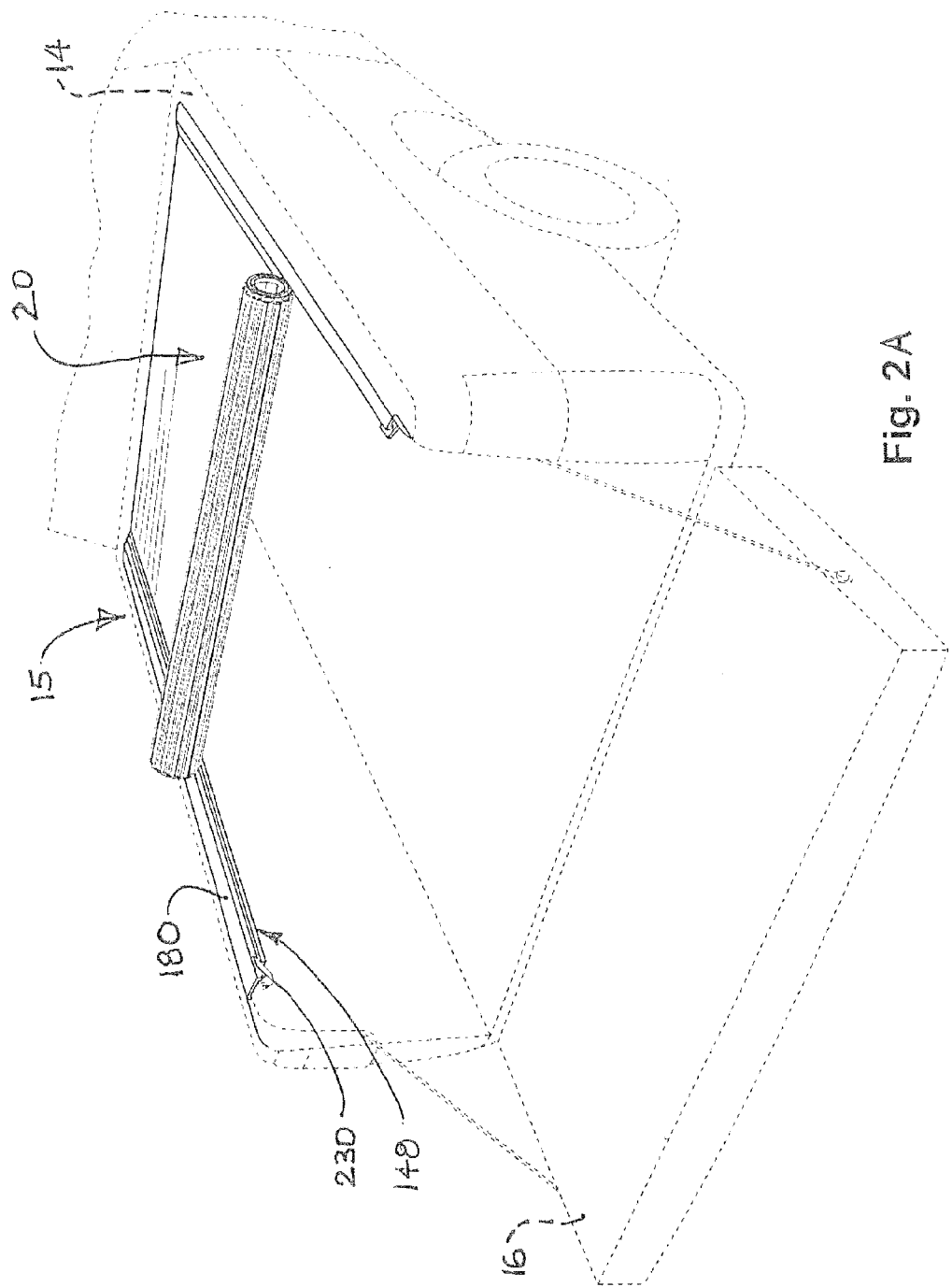

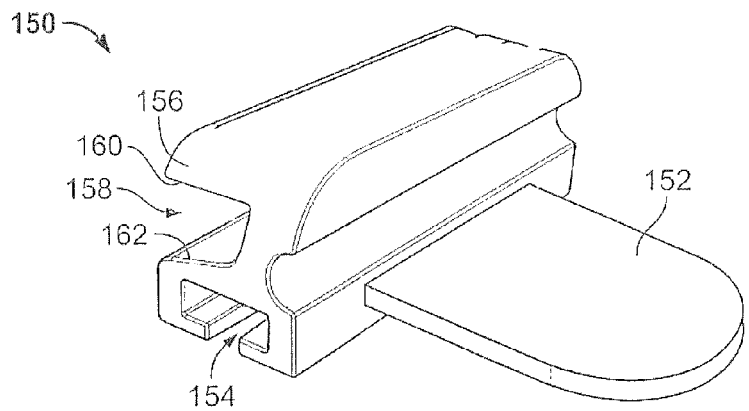
Fig. 7
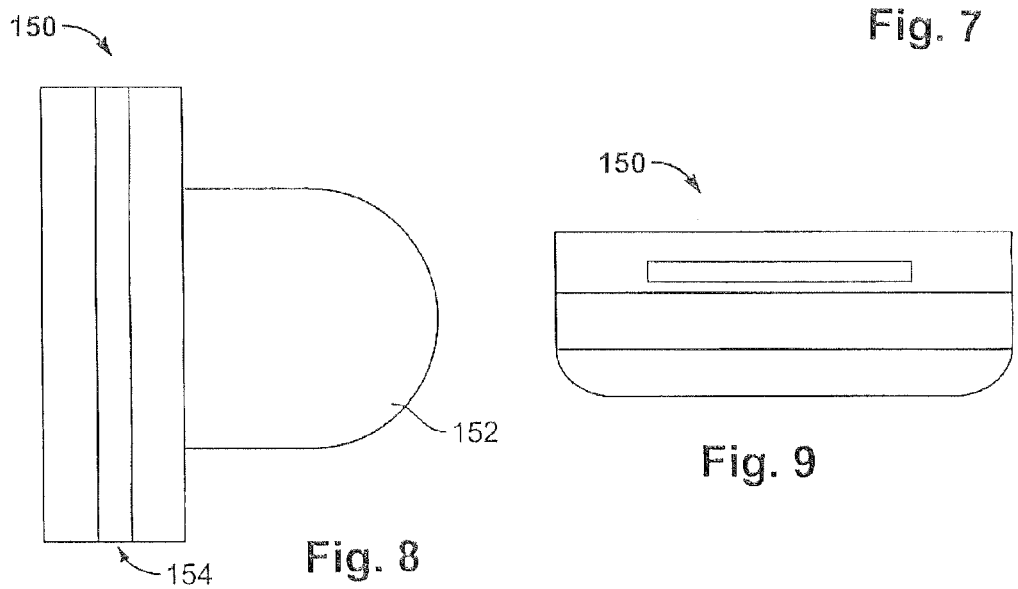
Fig. 8
Fig. 9
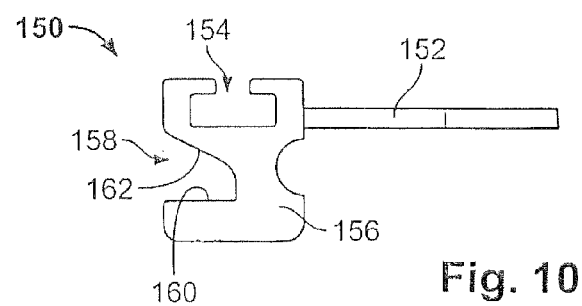
Fig. 10

ROLL UP PICK-UP TRUCK BOX COVER WITH LOCK DOWN SLATS

CROSS-REFERENCE TO RELATED APPLICATIONS

This application is a continuation of U.S. patent application Ser. No. 14/011,523 filed Aug. 27, 2013, now U.S. Pat. No. 8,939,494, which is a continuation of U.S. patent application Ser. No. 13/653,766 filed Oct. 17, 2012, now U.S. Pat. No. 8,544,934, which claims the benefit of U.S. Provisional Patent Application Nos. 61/553,828 filed Oct. 31, 2011; 61/553,885 filed Oct. 31, 2011; 61/553,814 filed Oct. 31, 2011; 61/602,280 filed Feb. 23, 2012; and 61/621,921 filed Apr. 9, 2012. The entire disclosures of the above applications are incorporated herein by reference.

BACKGROUND OF THE INVENTION

Pick-up trucks are one of the most popular and versatile vehicles in use today. Pick-up trucks typically have an enclosed cab and an open cargo box in the rear of the truck. The open cargo box allows all types of things to be quickly and easily loaded, carried and unloaded. Despite this versatility, the open cargo box has significant disadvantages. First, with the box tailgate closed, the box creates significant air turbulence and drag on the truck, especially at high speeds. This reduces the fuel efficiency of the vehicle and may also add to the noise level within the cab. Another disadvantage is the complete lack of security. Anything in an open box can be easily stolen. The open cargo box also leaves the contents of the box exposed to the weather.

Various types of box covers have been proposed to overcome these problems, including single piece covers as well as folding, retracting, and roll-up covers in so-called hard cover designs made of metal, fiberglass, and plastic, and/or so-called soft cover designs made of fabric. Still, disadvantages remain, including inadequate security, leaking, difficulty in installation and/or use. Accordingly, an improved pick-up truck cargo box cover is needed.

SUMMARY OF THE INVENTION

According to the principles of the present teachings, a cover assembly for a vehicle box is provided having advantageous construction. The cover assembly may include a plurality of slats with each slat pivotally connected to at least one adjacent slat and end fittings attached to opposite ends of each of the plurality of slats. Side rails are attachable to the vehicle box. Locking elements associated with each side rail are movable to engage and hold the end fittings onto the side rails. The locking element including a hook on a roll rod pivotally positioned within an arc section of the side rail. The roll rod is movable from a first position wherein the hook projects into a slot in the end fittings to a second position wherein the hook is withdrawn from the slot.

BRIEF DESCRIPTION OF THE DRAWINGS

In the drawings, the same reference number indicates the same element in each of the views.

FIG. 1 is a perspective view of a roll up cover shown in an unrolled position on the box of a pickup truck.

FIG. 2A is a perspective view of the cover of FIG. 1 shown in a partially rolled up position.

FIG. 7 is a bottom perspective view of an end fitting for use with the roll up cover shown in FIGS. 1-6.

FIG. 8 is a right side view of the end fitting shown in FIG. 7.

FIG. 9 is a front view of the end fitting shown in FIGS. 7 and 8.

FIG. 10 is an end view of the end fitting shown in FIGS. 7-9.

DETAILED DESCRIPTION OF THE DRAWINGS

Figure 1A:
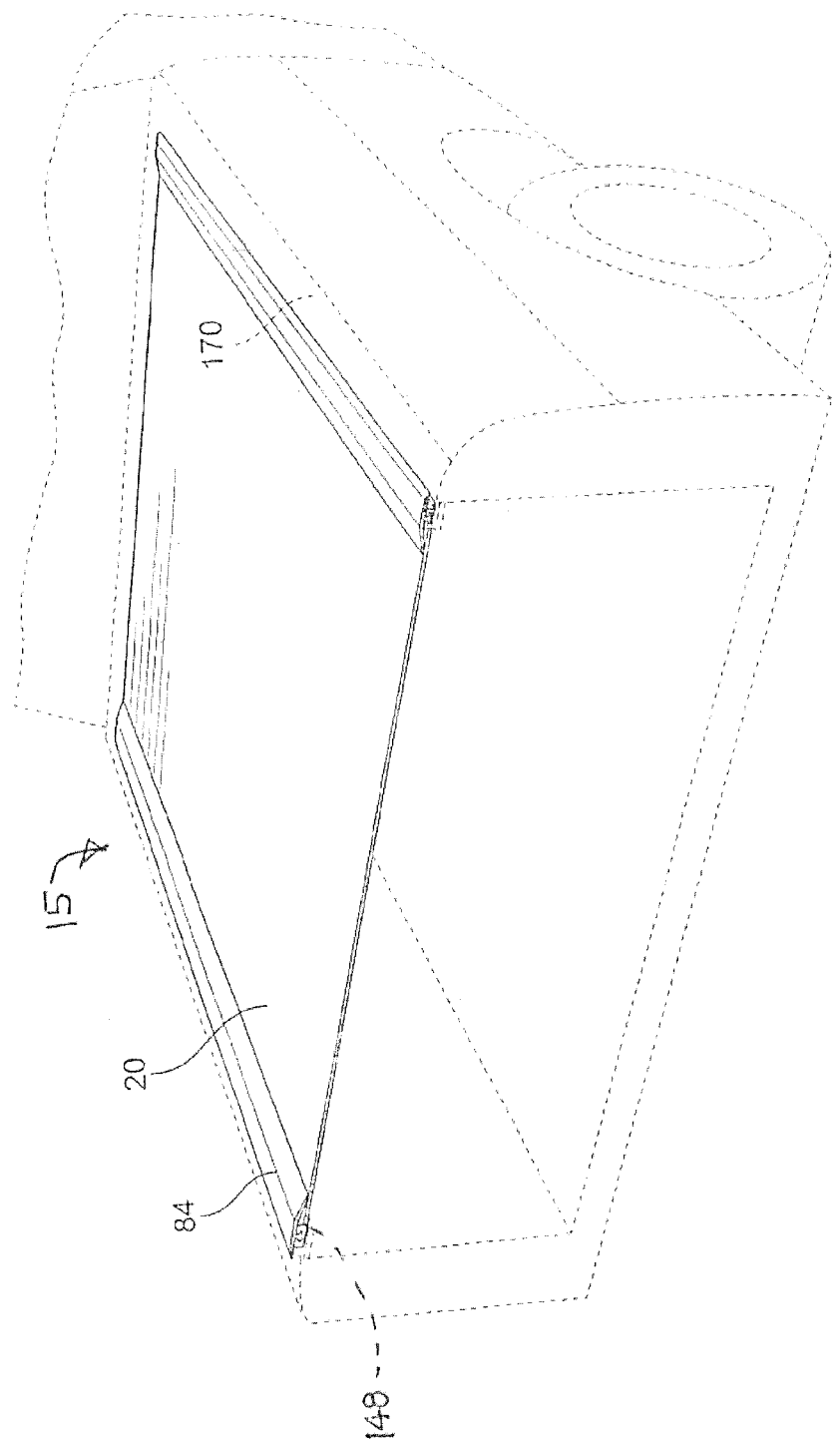
FIG. 1A is a section view taken along line 1A-1A of FIG. 1.
Figure 2:
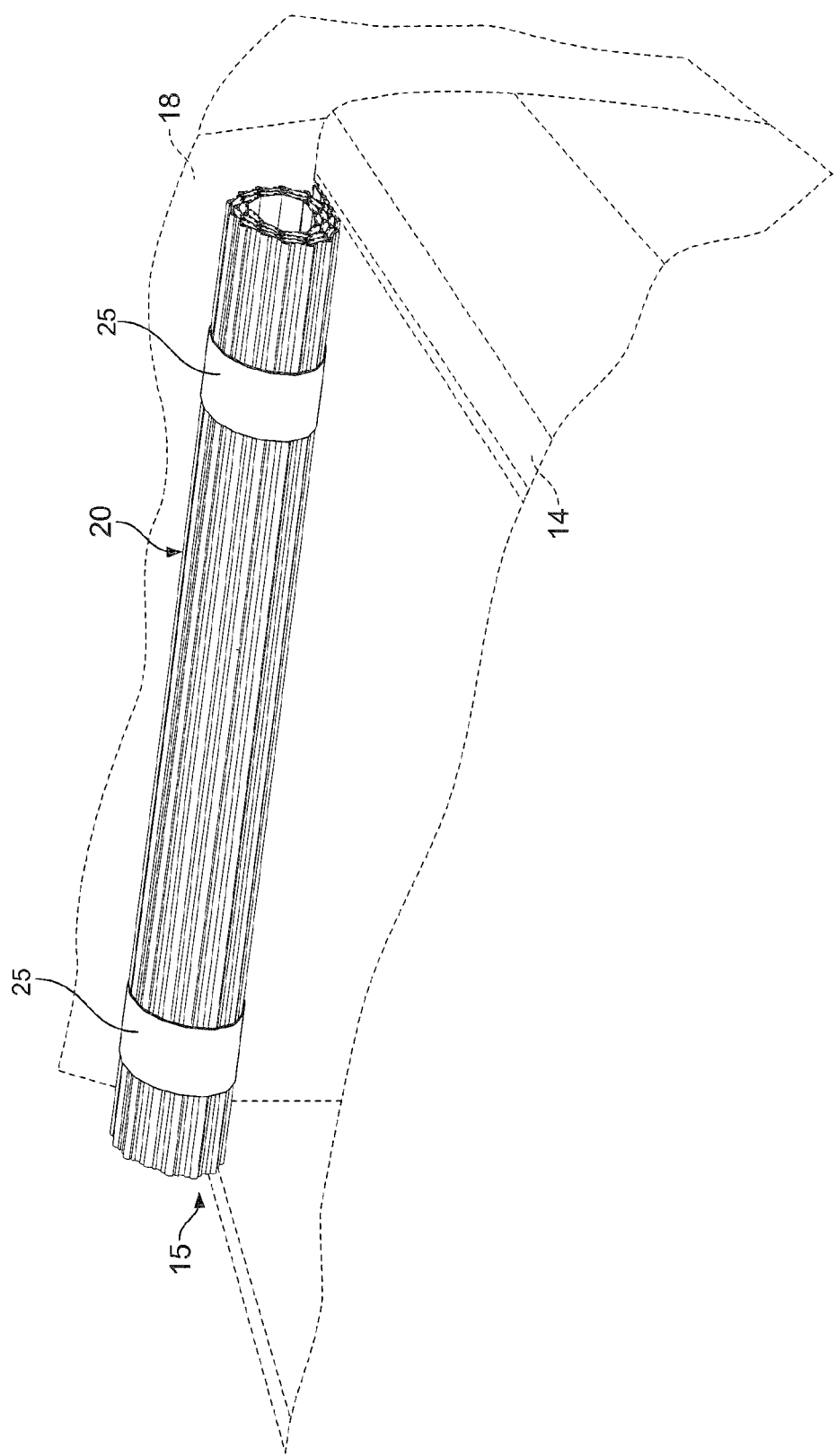
FIG. 2 is a perspective view of the cover of FIG. 1 shown in a fully rolled up position.

As shown in FIGS. 1-2A, a cover assembly 15 includes a roll up cover 20 and side rail assemblies 148 attached on opposite sides of the box 12 of a pickup truck 10. The cover 20 may be rolled up from a deployed or unrolled position shown in FIG. 1, to a rolled up position shown in FIG. 2, or to an intermediate position as shown in FIG. 2A. In the unrolled position shown in FIG. 1, the cover 20 is supported on side rails 180 of the side rail assemblies 148. The cover 20 may have seal strips 84 on each side overlying the box rails 14 of the box 12. The side rail assemblies 148 may be attached to the box rails 14 via clamping, for example as described in U.S. Pat. No. 7,537,264, incorporated herein by reference. A rear seal flap 151 on the back slat 27 may resiliently press onto and seal against the top or other surface of the tailgate 16.

As shown in FIG. 2, strips of felt 25 or other material may attached onto the bottom surface of the cover 20 to provide a handling surface. The cover 20 can then be rolled and unrolled without the need for the user's hand to touch the slats 26, which may become uncomfortably hot to the touch on hot sunny days.

Figure 4:
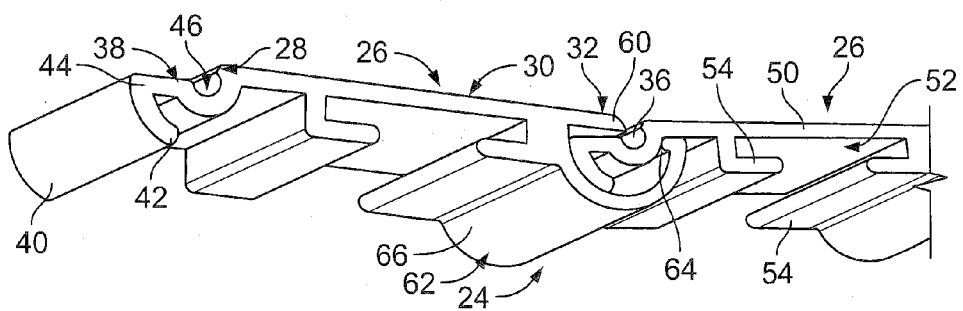
FIG. 4 is an enlarged perspective view of two adjoining slats or strips of the cover shown in FIG. 1.

The cover 20 is formed of interlocking or pivotally attached slats 26, which may be extrusions, such as aluminum alloy extrusions. FIG. 4 shows two adjacent slats 26. The width of the slats 26 (i.e. the dimension in the front/back direction of the truck 10 as shown in FIGS. 1-2A) may vary between 1 and 8 inches, with typical covers having slats that are 1.5 to 2.0 inches wide. Narrower slats may allow the cover 20 to roll up into a smaller diameter, allowing for more compact storage.

Most pickup truck boxes have a length varying between about 60 and 100 inches. As one example, using slats 2.0 inches wide, a cover for a 60 inch box would have about 30 slats, while a cover for a 100 inch box would correspondingly have about 50 slats. The height or thickness of the slats HH in FIG. 5 may range from about 0.18 to 0.6 inches, typically ranging from about 0.2 to 0.4 inches.

A typical cover dimensioned for a 90-100 inch long box may have a diameter when rolled up of less than 14, 12, 10 or 8 inches. This avoids obstructing the rear view from the cab 18. Generally, the headrests on the seats in the cab will be higher than the rolled up cover, to the extent that the rolled up cover may have virtually no effect on the rear view from the cab. Since the cover rolls up and not down, it does not take up any space in the box 12 or require a canister in the box to hold the rolled up cover.

The cover 20 and the side rail assemblies 148 may be dimensioned so that the top surface of the cover 20 is substantially flush with the top surface of the box rails 14. In this case, the cover assembly 15 may present a low-profile streamlined appearance, with the cover only nominally visible when the truck is viewed from the side or rear at eye level. With the cover supported on the side rails 180, and not on the box rails 14, the cover 20 does not obstruct the stake pockets, and it does not interfere with use of bed extenders, bed rails, tie downs, racks, and other accessories. The cover is also easily installed on most or all pick-up trucks, without drilling any holes.

Figure 3:
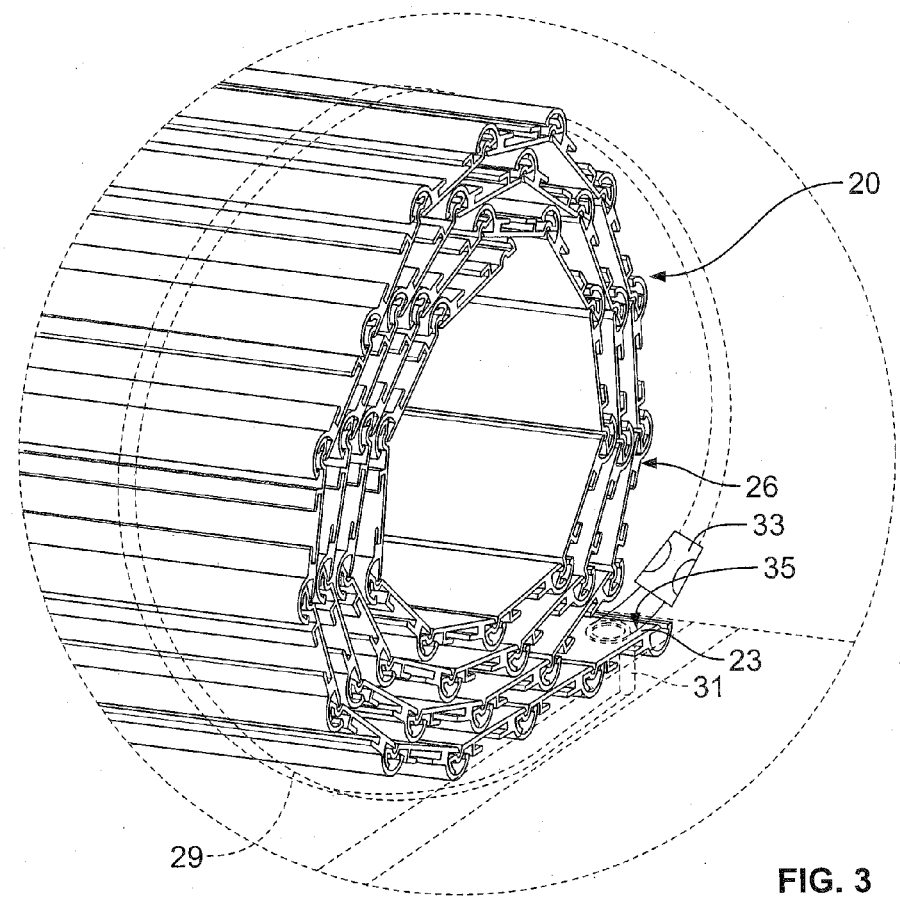
FIG. 3 is an enlarged perspective view of the cover as shown in FIG. 2, with components removed for purposes of illustration.

Although the drawings show slats 26 of constant length (extending laterally across the box), covers having slats of varying length may also be used. For example, slats at the back end of the cover, closer to the tailgate 16, may be shorter than the slats closer to the cab 18, so that the length of the slat is proportional to slat position in the coil of slats when the cover is rolled up, as shown in FIG. 3. The width of the slats (in the front/back direction of the box 12) will vary with the width of the box 12, which for most pickup trucks is about 52 to 75 inches. Typically all of the slats have the same width, and the cover 20 is rectangular. FIG. 3 shows the cover 20 with the end fittings 150 removed for purpose of illustration.

Referring still to FIG. 3, a strap 29 may be provided on each side of the cover 20, to hold the cover into the rolled up position. On each side of the cover 20, a fixed end of the strap 29 may be attached to a blind stud 31 or other fitting on the bottom side of the front slat 23 (the forward-most slat on the cover). The fixed end of the strap may optionally be attached to the front end of each side rail 180. With the cover rolled up, the strap 29 may be drawn up and around the cover and releasably attach to a buckle or latch 33 attached to a top surface of the front slat 23, optionally on a short tether 35.

Turning to FIG. 4, all of the slats 26 may optionally have the same design. This allows a single extrusion to cut to the desired length to provide the slats 26. Although designs with slats of two or more different designs may be used, the design shown in FIG. 4 having a single slat design simplifies manufacturing. As shown in FIG. 4, a representative slat 26 has a first side 28, a middle or web section 30 and a second side 32. An inner hinge element 38 is on the first side 28, and an outer hinge element 62 is on the second side 32. The inner hinge element 38 may include a curved or radiused lip 40 attached to a leg 44 on an arc step 46 joined to the web section 30. A groove 36 may be provided on the top of the arc step 46. The arc step 46 positions the flat top surface of the leg 44 slightly below the flat top surface 50 of the web section 32.

Referring still to FIG. 4, the outer hinge element 62 on the second side 32 of the slat 26 may include a curved or radiused hook 66 having an end stop 64. A ledge 60 on the second side 32 may project outwardly partially over the hook 66. The inner hinge element 38 is sized and shaped to fit inside of the outer hinge element 62, to form a pivoting hinge joint, generally indicated at element number 24, attaching adjacent slats 26. In the example shown the inner hinge element comprises the lip 40 and leg 44 and the outer hinge element comprises the hook 66 and the end stop 64. However, other hinge elements may alternatively be used. The positions of the elements described may of course also be reversed.

Figure 5:
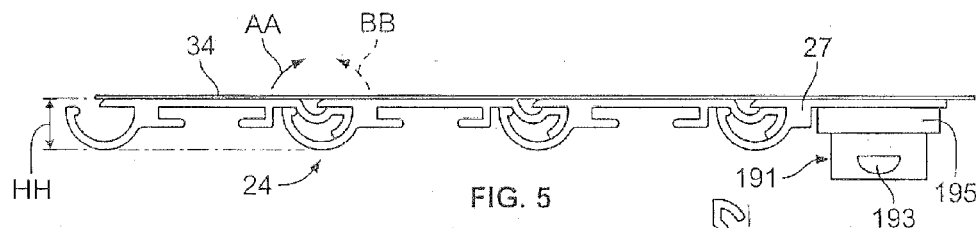
FIG. 5 is a section view of the back end or last slat and two adjoining slats of the cover in the unrolled position as shown in FIGS. 1 and 4.
Figure 6:
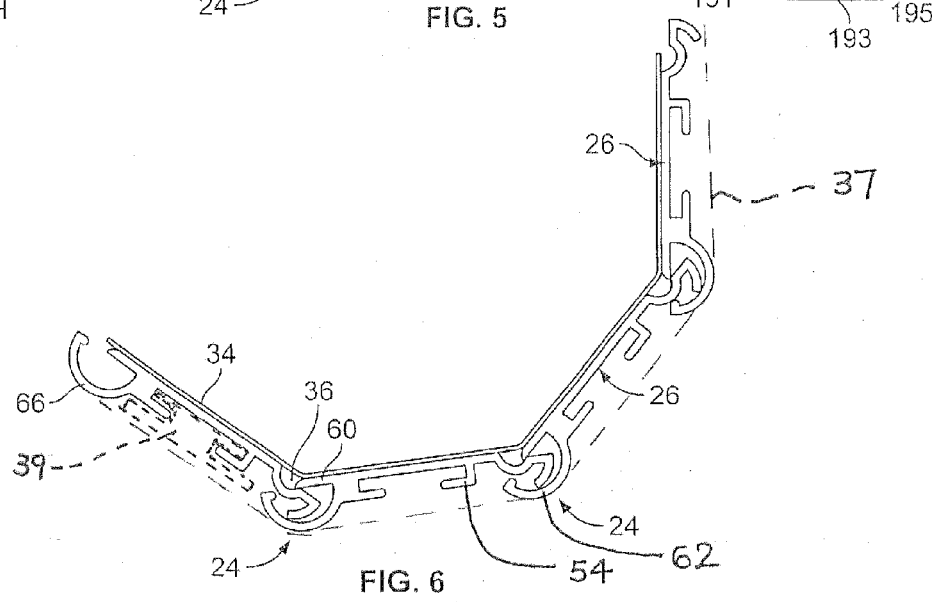
FIG. 6 is a section view of three adjoining slats of the cover in the rolled up position as shown in FIGS. 2 and 3.

In the example shown, the web section 30 has a flat top surface that is also coplanar with the ledge 60 on the second side 32. As shown in FIG. 4, a slot 52 may be provided on the bottom surface of the web section 30 between an opposing pair of slot arms 54. As shown in FIGS. 5 and 6, a sheet of preferably water impermeable and flexible material 34, such as vinyl, is attached to the flat top surface, e.g., with adhesive. The sheet may extend continuously over substantially the entire top surface of the cover 20, excluding the end fittings. The sheet of material 34 helps to seal the box 14 against egress of water, dust etc., when the cover 20 is closed. The sheet 34 may also optionally be imprinted with decorative designs, images or logos. In an alternative design, separate individual strips of flexible material may be attached over the hinge joints 24.

Figure 4A:
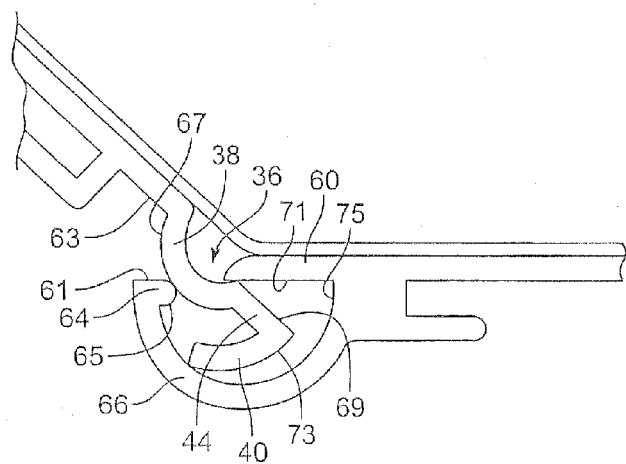
FIG. 4A is a further enlarged end view of two adjoining slats or strips of the cover shown in FIG. 1.

Turning now also to FIG. 5, with the cover 20 in the flat or unrolled position, the slats 26 may be locked out against downward rolling or curving movement. As shown in FIG. 4A, with the cover unrolled, the top surface 69 of the leg 44 is in contact with the bottom surface 71 of the ledge 60. In addition, the top surface 61 of the stop 64 is in contact with the bottom surface 63 of the web 30. Consequently, in this position, the hinge joints 24 only allow pivoting movement in the direction of arrow AA in FIG. 5, and not in the direction of arrow BB. When in the unrolled position as shown, the slats 26 consequently remain generally flat and resist upward movement.

Referring to FIGS. 4, 4A and 5, the slats cannot be linearly pulled apart as the inner surface 65 of the hook 66 bears against the outer surface of the inner hinge element 38, and the lip 40 rests on the top surface of the hook 66. Similarly, the slats cannot be compressed together because the lip end 44 presses against the upper surface 75 of the hook 66. The engagement of the slats consequently has two spaced apart sets of engagement surfaces (61/63 and 69/75) that prevent downward rolling movement (in the direction BB in FIG. 5), a set of tension engagement surfaces 65/67, and a set of compression engagement surfaces 73/75.

As shown in FIGS. 5 and 6, the hinge joints 24 allow movement in the direction of arrow AA, up to a selected angle determined by the relative positions of the stop 64 on the hook 66, and the end 42 of the lip 40. In the specific design shown, the slats may be designed to allow up to about 75, 85, 95, 105 or more degrees of movement between adjacent slats. Allowing a larger angular range of movement between adjacent slats allows the cover 20 to fold as well as to roll up. Movement of the lip 40 into contact with the stop 64 prevents further movement. As a result, the cover rolls up, without adjacent slats folding over onto each other.

As shown in FIGS. 4, 5 and 6, when unrolled, the slats 26 may form a generally flat and rigid hard plate-like cover structure. As shown in FIGS. 4-5, when the cover is unrolled, the contact between the flat leg 44 against the ledge 60, and the contact between the stop 64 and the bottom surface of the web 30, resists upward bowing or bending between adjacent slats 26. The cover 20 is consequently highly resistant to forced entry.

If the cover is designed with slats 26, the cover 20 will freely roll up as shown in FIG. 2, but will resist downward rolling due the engaging surfaces of the slats, as described above. However, a bi-directional cover may be made with slats without the engaging surfaces. In this case, the bi-directional cover 20 can either roll up or roll down. If the bi-directional cover is used with the side rails 180, the side rails alone may allow the bi-directional cover to roll up but prevent the bi-directional cover from rolling down. Accordingly, the cover assembly 15 as described here may use either a roll up cover as shown in FIGS. 3-6, or a bi-directional cover having slats forming hinge joints 24 that allow adjacent slats to pivot up or down.

The flexible material 34 may bow or crease into the groove 36 as the cover is rolled up. As shown in FIG. 6, when partially or fully rolled up, the ledge 60 of one slat 26 may extend partially into the groove 36 of an adjacent slat.

FIGS. 7-10 show an end fitting 150 for use in the cover assembly 15. The end fitting 150 has a tab and a T-slot 154. With FIG. 7 showing the end fitting 150 inverted for purpose of illustration, the end fitting 150 has a foot 156 having a foot groove or slot formed between a foot floor 160 and a foot top surface 162 at an acute angle to the foot floor 160. The foot floor 160 may be flat and horizontal, and parallel to the top surface of the arms forming the T-slot. The foot top surface 162 may form an angle of 20 to 60 or 30 to 45 degrees to the foot floor.

Figure 11:
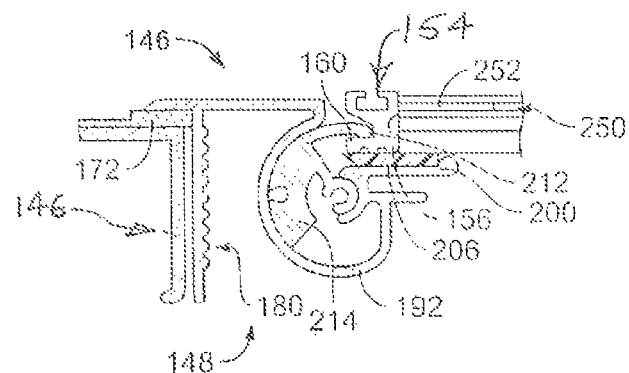
FIG. 11 is a section view of one side of the roll up cover assembly of FIGS. 1-9 shown in the locked position.
Figure 12:
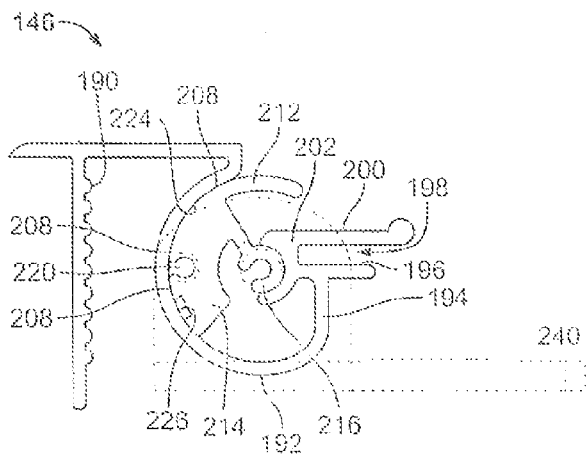
FIG. 12 is a section view of the side rail of the cover assembly shown in FIG. 11 in an intermediate position.
Figure 13:
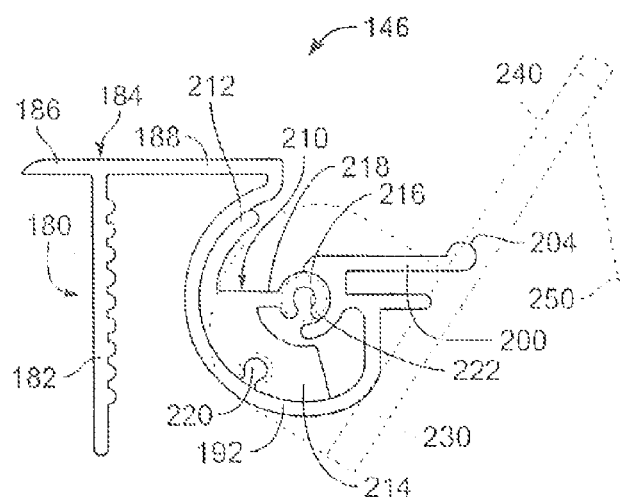
FIG. 13 is a section view of the side rail of the cover shown in FIG. 11 in an open or unlocked position.
Figure 14:
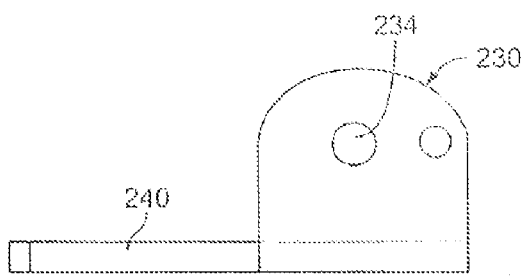
FIG. 14 is an end view of the drive plate shown in FIGS. 12 and 13.

FIGS. 1-13 show one side of the cover assembly 15. The opposite side may be a mirror image of the side shown. The seal strip 84 shown in FIGS. 1 and 11 is omitted from FIG. 21 for purpose of illustration. Referring to FIGS. 11-13, each side rail assembly 148 of the cover assembly 15 has a side rail 180 having a top plate 184 attached to a clamp plate 182. Grip ridges 190 may be provided on the inner surface of the clamp plate. The top plate 184 may be perpendicular to clamp plate 182. The top plate has an outer section 186 that rests on the box rail 14 of the box 12 of pick-up truck 10, optionally with a resilient strip 172 between them, as shown in FIG. 11. The side rail 180 also has an arc section 192 attached to an inner section 188 of the top plate 184. The arc section 192 extends in a circular arc from the inner section 188 of the top plate to a vertical segment 194. The vertical segment 194 may be straight with the arc section 192 and the vertical segment 194 having a G-shape.

A latch plate 196 may be attached on top of the vertical segment, typically perpendicular to the vertical segment 194. A cup section 202 is attached to the latch plate 196, with the cup section having a center of curvature co-linear with the center of curvature of the arc section. A fitting arm 200 is attached to the cup section 202 and may be parallel to and overlie the latch plate 196. The inner edge of the fitting arm 200 may have a radius 204, to allow latches on the cover to more easily pass by the fitting arm 200 and extend into a latch slot 198 between the fitting arm 200 and the latch plate 196. A resilient seal strip 206 may be adhered to or otherwise provided on the top surface of the fitting arm 200, as shown in FIG. 11. In some designs, the latch plate 196 and the latch slot 198 may be omitted.

A roll rod 210 is pivotally contained within the arc section 192 of the side rail 180. As shown in FIGS. 12 and 13, the roll rod 210 has an arcuate hook 212 attached to a counter weight section 214. An inner cylinder 216 is attached to the counter weight section on an arm 218. The inner cylinder 216 fits inside of and pivots or rotates within the cup section 202. The outer surface of the roll rod has a radius nominally less (0.001 to 0.025 inch) than the radius of the inner wall of the arc section 192. Projections 226 may be formed in the outer surface of the roll rod 210 to form spaced apart bearing surfaces. In this design, only the bearing surfaces 224 contact the inner wall of the arc section 192, to allow the roll rod 210 to rotate more smoothly. The side rail 180 and/or the roll rod 210 may also be powder coated, or provided with other similar coatings, to reduce friction between them.

A drive plate 230 is attached to the back end of the roll rod 210, typically adjacent to the tailgate of the pick-up truck. A pin 234 on the drive plate 230 may be pressed or positioned in a hole or slot 220 in the counter weight section 214. Another bolt, pin or spline at the center of the drive plate 230 may be used to attach the drive plate to the roll rod 210. The drive plate 230 on the left side rail assembly 146 shown in FIG. 13 is a mirror image of the drive plate 230 on the right side rail assembly 146 shown in FIG. 15.

FIG. 13 shows the side rail assembly 148 in the open position, where the drive plate 230 extends upwardly and inwardly at an angle of about 45 degrees, and with an inner end of the drive plate 230 projecting above the fitting arm 200. In the open position, the hook 212 is withdrawn into the arc section 192. This allows the end fittings 150 of the cover move down onto the fitting arm 200, as the cover 20 is unrolled. Similarly, the end fittings can be freely lifted and rolled up and off of the fitting arm 200 as the cover is rolled up. The weight of the counter weight section may automatically hold the roll rod 210 into the open position shown in FIG. 13.

As the cover is unrolled, the roll rod 210 remains in the open position until the last slat at the back end of the cover moves down onto the inner end 240 of the drive plate 230. As this occurs, the downward closing force of the slat rotates the drive plate 230 and the roll rod from the open position shown in FIG. 13, through the intermediate position shown in FIG. 12, into the closed or locked position shown in FIG. 11. As the roll rod 210 moves into the closed position, the hook 212, which extends over the entire length of the roll rod 210, rotates inwardly and downwardly into the foot slot 158 of each of the end fittings 150 on the cover.

Movement of the hook 212 into the foot slot 158 of each of the end fittings, on both sides of the cover, securely locks the cover down onto the side rail. The hook 212 may optionally contact and press down on the foot 156 of each fitting, to clamp each fitting onto the fitting plate 200 of the side rail 180. This can help to prevent any rattling or shaking of the cover while driving. It can also help to hold the edge seals down tightly against the box rails. With the hook positively pressing down on the foot 156 of each fitting, even slight upward movement of the cover off of the rails is prevented. This helps to discourage attempts to forcibly break into the box 12 via prying.

Each side of the last slat 27 (i.e., the slat at the back end of the cover adjacent to the tailgate 16) may have a latch 191 mounted on a spacer 195 with a plunger 195 movable into the latch slot 198, or into a position under the fitting arm 200, if no latch slot 198 is used, for example as shown in FIG. 5 and as described in U.S. Pat. No. 7,537,264. The last slat 27 may alternatively have a keyed lock that engages with the tailgate, to prevent the cover from being opened or rolled up, even partially, without unlocking the last slat, and/or the tailgate.

Referring to FIG. 13, optionally, a tether or a linkage 250 may be attached to one or both of the drive plates 230, to secure the roll rods 210 into an open or a closed position. For certain uses, it may be advantageous to roll the cover up only part way. In this case, the tether or linkage can be used to move the roll rod 210 into the closed or locked position, even though the last slat of the cover is not pressing down on the drive plate 230.

The side rail 180 and the roll rod 210 may be aluminum extrusions. In this case, their various sections and components are integrally formed as single units. As described here, a section or component attached to another section of component means that it may be conventionally attached or integrally formed.

Figure 15:
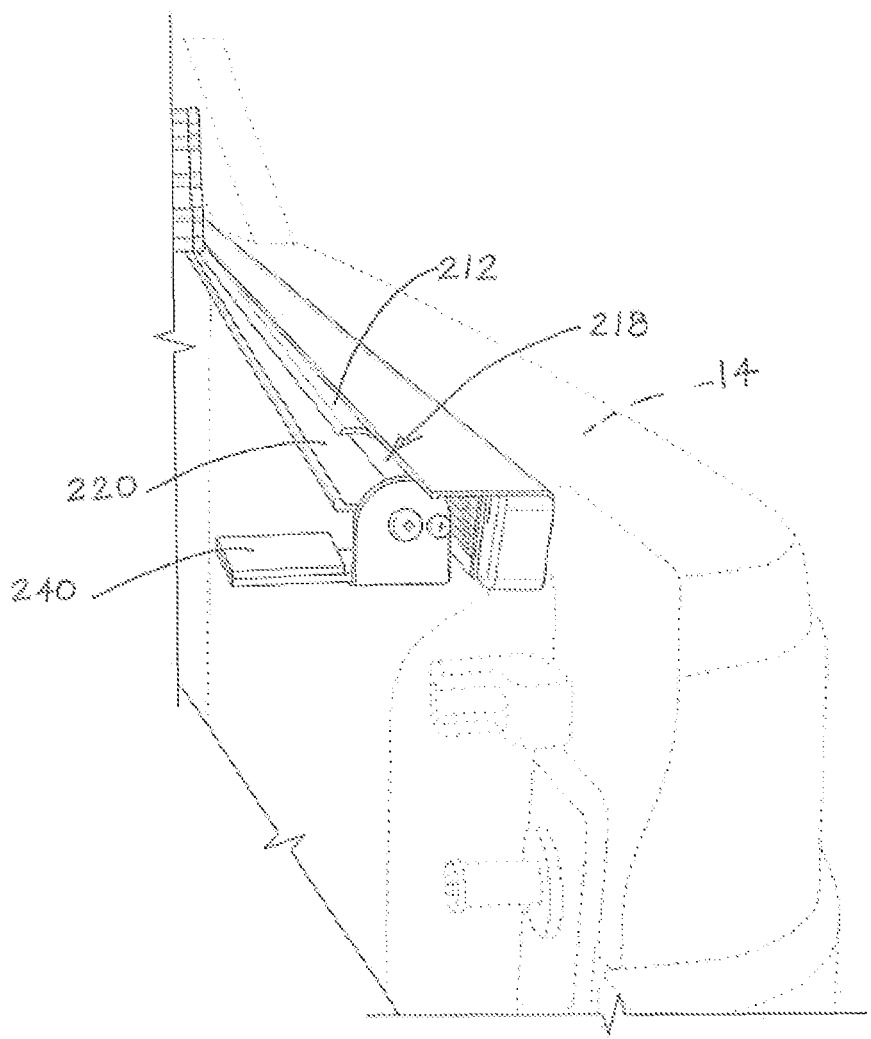
FIG. 15 is a perspective view of the side rail of the cover assembly shown in FIGS. 1-14.

Referring to FIG. 15, the last few inches of the hook 212 at the back end of the roll rod may optionally be removed leaving a gap 218, to allow several slats to lift off of the side rails together. In this case, the cover may be opened and closed without necessarily using a pure rolling movement at the back end of the cover.

Referring to FIGS. 2A, 3 and 15, the cover 20 may be partially rolled up and locked in position, for example as shown in FIG. 2A, via the same sequence described above. With the cover 20 partially rolled up as in FIG. 2A, inward movement of the hook 212 will engage the foot slot 158 of the end fittings 150 on the slats 26 in the front section of the cover 20. Accordingly, the cover 20 may be locked into various intermediate positions between fully unrolled and closed, and fully rolled up and open.

The back or last slat 27 cannot depress the drive plates 230 to operate the roll rods 210 when the cover 20 is in a partially rolled up position. Accordingly, the tether or linkage 250 may be used to manually rotate and hold the roll rods 210 inwardly. The tether may be formed via an elastic cord and a hook for engaging a fitting at the back end of the box 12. The linkage may be a bar or lever similarly positioned, for moving the roll rods 210 into the locked position without the need for the last slat 27 to actuate the drive plates 230.

Figure 11A:
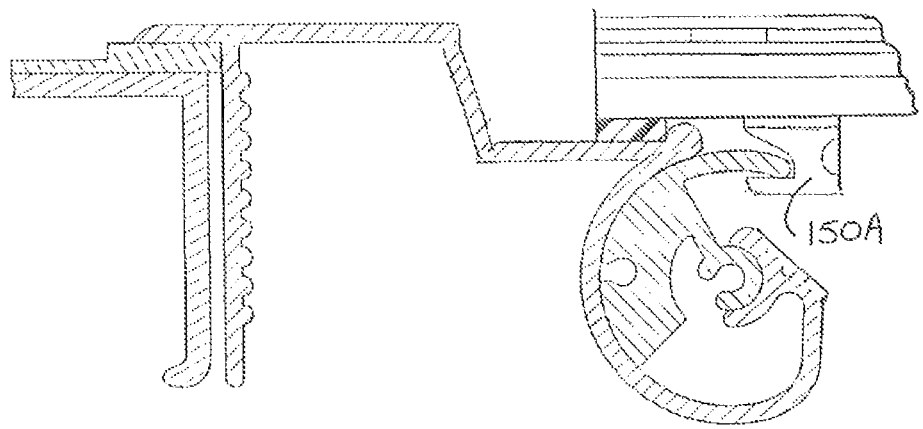
FIG. 11A is a section of one side of an alternative design roll up cover assembly.

Although FIGS. 11-13 show a roll rod 210 used to lock the cover 20 onto the side rails 180, other mechanisms may alternatively be used. For example, mechanisms that linearly move an element into the foot slots 158 horizontally from the side, or on an angle from above the foot slots 158 may be used. FIG. 11A shows an alternative design with a hook 212 or similar element engaging into a fitting 150 on an inboard bottom surface of the cover, rather than at the sides of the cover as shown in FIG. 11.

Figure 16:
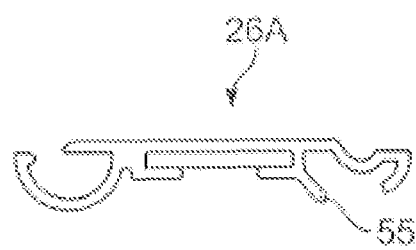
FIG. 16 is an end view of an alternative slat design.

The cover 20 may optionally use slats such as slat 26A shown in FIG. 16 which is the same as the slat 26, but includes a slot extension 55 which may be provided to reduce pinch points.

Figure 17:
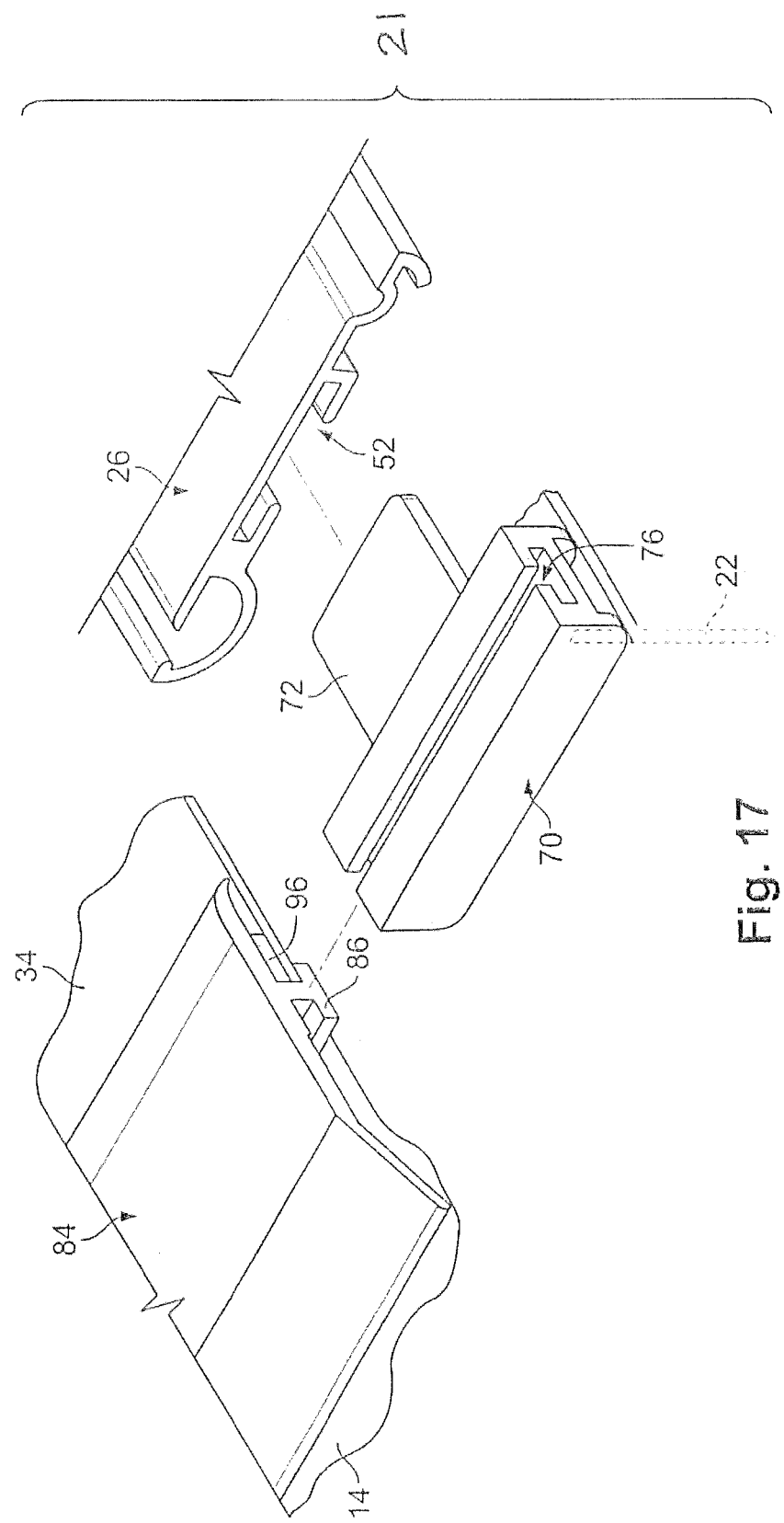
FIG. 17 is an exploded perspective view of an alternative embodiment showing an end fitting attached to a slat and a seal strip attached to the end fitting.

FIG. 17 shows an alternative cover 21 using a different end fitting 70 along with the resilient seal strips 84. In FIG. 17, a tab 72 of each end fitting is pushed or positioned into a slot 52 and is held in place with fasteners or adhesive. A T-section of the seal strip 84 is slid or threaded through a slot 76 in each end fitting 70, at both ends of the slats 26. This may be done before or after the end fittings are attached to the slats 26. The length of the body 74 of the end fittings may be less than the width of the slats 26. This leaves a free segment of the seal strip between each adjacent end fitting 70. Consequently, the free segment of the seal strip 84 can freely flex and bend as the cover is rolled and unrolled.

Figure 18:
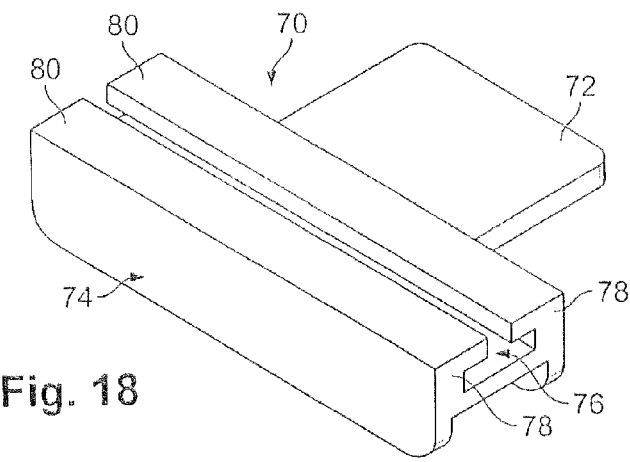
FIG. 18 is a front perspective view of the end fitting shown in FIG. 17.
Figure 19:
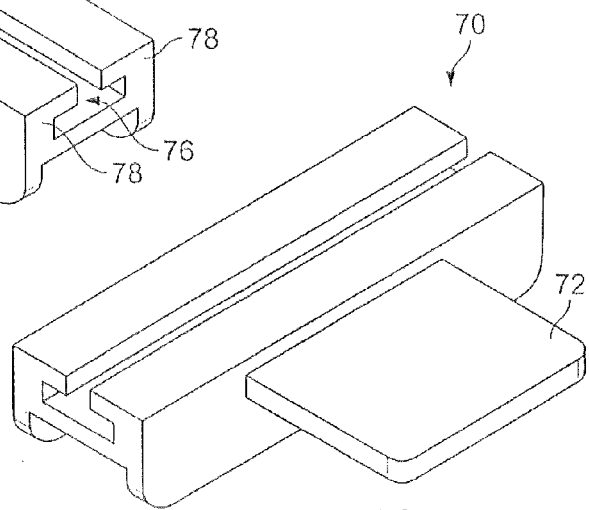
FIG. 19 is a rear perspective view of the end fitting shown in FIG. 18.
Figure 20:
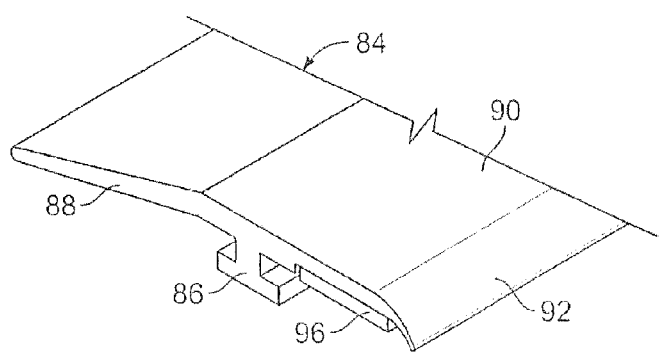
FIG. 20 is an end perspective view of the seal strip shown in FIG. 17.
Figure 21:
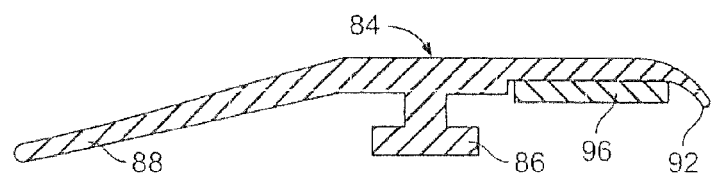
FIG. 21 is a section view of the seal strip shown in FIG. 17.

As shown in FIGS. 18 and 19 the T-slot 76 is located between arms 78 on the body 74 of the end fitting 70. The arms 78 have flat top surfaces 80. Turning to FIGS. 20 and 21, the seal strip 84 has an outer arm 88 and an inner arm 90 joined to a T-section 86. The inner arm 90 may include a seal lip 92. The seal strip 84 is a resilient material, such as rubber. This attachment of the end fittings to the slats 26, and this attachment of the seal strip to the end fittings, may also be used with the end fittings 150 in the cover 15 described above.

With the cover 21, the end fittings 70 rest on top of a side rail and the individual end fittings 70 are not engaged or locked down. Rather, the cover 21 is attached to the front ends of the rails, e.g., via fasteners, and the back end of the cover is latched or locked down via latches 195 shown in FIG. 6 or similar devices. Consequently, simple side rails, such as the side rail 302 shown in FIG. 27 may be used.

FIGS. 22-26 show another alternative cover assembly 100. This design uses an end fitting 70A having a tab 72A extending at right angles from a body 74A. A T-slot 76A is formed between inverted L-shaped arms 78A on the body, with the arms 78A having flat top surfaces 80A. The fitting 70A has a foot 82 on the bottom of the body 74A, with a foot slot 83 in the foot. Only the foot 82 and foot slot 83 at one end of the fitting 70A is used. However, if the fitting may be symmetrical front-to-back, so that the same fitting may be used on both sides of the cover, instead of having separate and different left and right side fittings.

Figure 22:
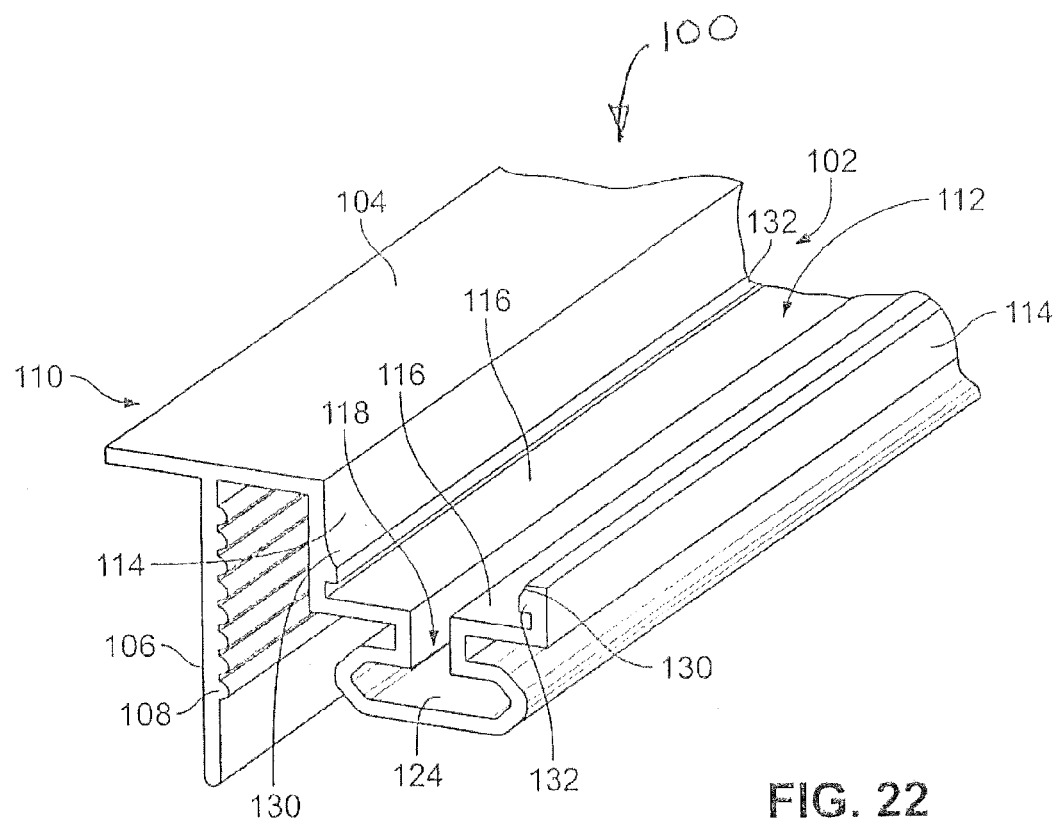
FIG. 22 is a perspective view of another alternative embodiment side rail.
Figure 26:
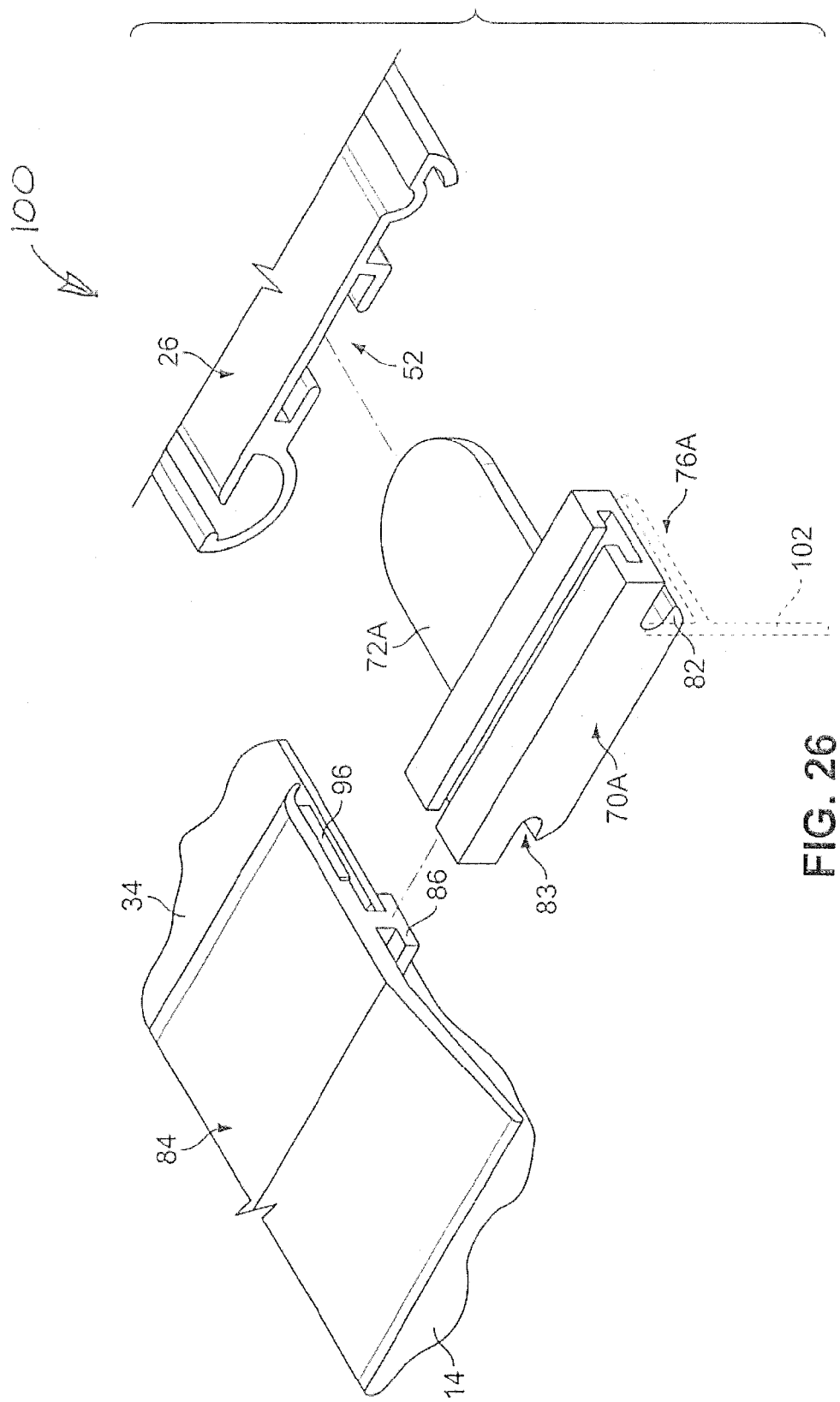
FIG. 26 is an exploded perspective view showing the attachment of the end fitting to a slat of a cover for use with the side rails of FIG. 22, and showing a seal strip attached to the end fitting shown in FIGS. 24 and 25.

As shown in FIG. 26, the fitting 70A is attached at the opposite ends of each slat 26 of the cover and the seal strip 84 attached as described above relative to FIG. 17. FIG. 22 shows a side rail 102 generally having a T-section 110 and an end fitting channel section 112. The T-section includes a top plate or surface 104 and a clamp plate 106 extending down to the top plate 104. Ridges 108 or other gripping surface elements may be provided on the inside surface of the clamp plate 106. The end fitting channel section 112 generally includes channel sidewalls 114 joining channel floors 116 on opposite sides of a drain slot 118 leading down to a drain channel 124.

The channel sidewalls 114 may be parallel to the clamp plate 106. The channel floors 116 may be parallel to the top plate 104. The top plate 104 may be perpendicular to the clamp plate 106 and/or the channel floors 116. The drain channel 124 may be flat with angles sides, as shown, or it may be tubular, square, or of other geometric or irregular shape. The bottom surface of the drain channel 124 is preferably continuous to allow the drain channel 124 to carry water without leaking.

Figure 23:
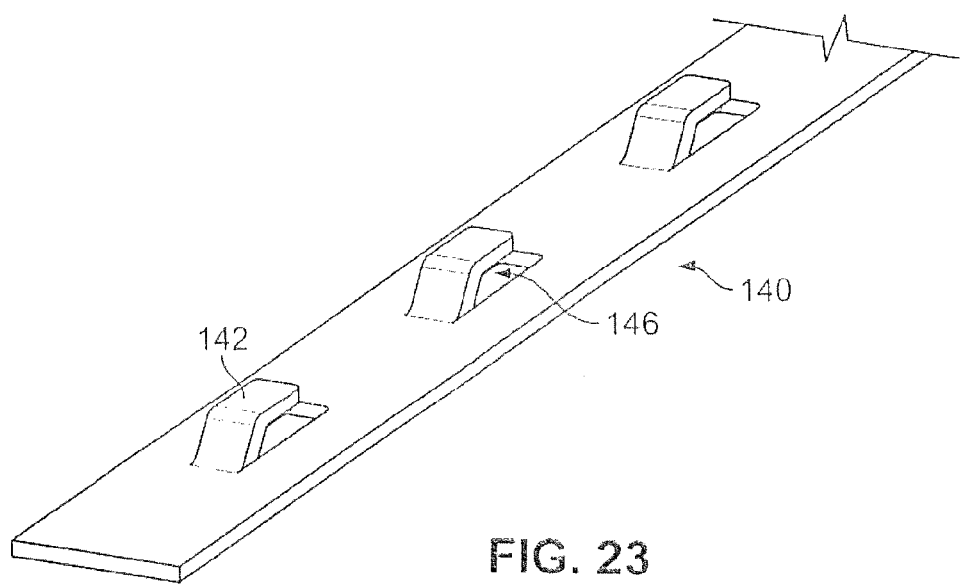
FIG. 23 is a perspective view of a hook strip for use with the side rail shown in FIG. 22.

Referring still to FIG. 22, a curve or ramp surface 130 on the channel sidewalls may extend down and end at a retainer lip 132. As shown in FIG. 23, a hook strip 140 has upwardly projecting equally spaced apart hooks 142. The hooks 142 are spaced apart by the same dimension as the spacing between adjacent end fittings 70A. The hook strip 140 is sized and shaped to fit into or onto the end fitting channel section 112. In the design shown, the hook strip 140 is designed to slide into channel section 112 from one end, with the retainer lips 132 holding the hook strip 140 in the channel section 112. Alternatively, the ramp section 130 and/or the retainer lips 132 may be omitted and the hook strip may be attached onto the side rail 102 via adhesives, welding, fasteners, etc.

As shown in FIG. 23, the hook strip 140 may have openings 146, to allow water in channel section 114 to move through the hook strip 140 and into the drain slot 118 and the drain channel 124. Alternatively, other drain passages may be provided via grooves, slots, protuberances, etc. on the channel floors 116 and/or the bottom or sides of the hook strip 140. Typically, the number of hooks 142 matches the number of slats 26.

Referring to FIGS. 22-26, the openings or raised ends of the hooks 142 are facing the back of the truck. The forward-most slat 23 of the cover 20 is attached to the side rails 102, typically via a fastener or stud on the slat 23 extending through an extension plate on the slat 23, or optionally through the top plate 104 between the clamp plate 106 and the outer channel sidewall 114. The cover 20 may be rolled up to provide access to the box of the truck. One or more tethers or clips may be used to hold the cover in the rolled up position, while driving the truck, if desired.

To cover the box, the cover 20 is unrolled. As this occurs, the end fittings 70A on the left and right ends of the slats 28 sequentially move into the channel section 112. The foot 82 of each end fitting 70A moves under a hook 142, with the back end of the hook 142 moving into the foot slot 83.

With the cover 20 unrolled, the box is covered and secure, and may not be accessed without opening the tailgate, as shown in FIG. 1. The lock on the tailgate 16 may therefore be used to lock the box as well. With the cover unrolled, the slats 26 may not be lifted up off of the side rails 22 because of the engagement of the hooks 142 into the foot slots 83 of the end fittings 70A. Consequently, the cover is firmly secured at the sides to better resist prying and/or impacts intended to breach the cover 20.

The hooks 142 may be replaced by lateral pins, loops or bars, since the cover 20 using the end fittings 70A only requires equally spaced apart fixed rail elements on or in the side rails to engage with a corresponding element on the cover, when the cover is unrolled. While the drawings show hooks 142 on a separate hook strip 140, the strip 140 may be omitted and the hooks 142 or similar element provided directly in or on the side rail 26. For example, in place of hooks 142 on a hook strip 140, lateral tabs or projections may be formed on the side rails, with the end fittings attaching around or onto the tabs in a rolling engagement.

It is also possible to reverse the position of the foot slots and the hooks, by placing a hook or other projection on the end fitting, and providing slots or recesses in the side rail adapted to be engaged by the projections on the end fittings. It is also possible to use inter-engaging or inter-fitting projections on both the end fittings and on the side rails.

Since the end fittings move in an arc when engaging or disengaging from the hooks 142, the foot slots 83 and/or the hooks 142 may optionally be curved to generally match the arc of movement. If used, the curvature of the slots 83 and or the hooks 142 may change progressively from front to back, to match the radius of curvature of the cover. Specifically, since the slats at the back of the cover move in a tighter radius than the slats at the front of the cover, the slots 83 and hooks 142 may have more curvature at the back than at the front.

Figure 24:
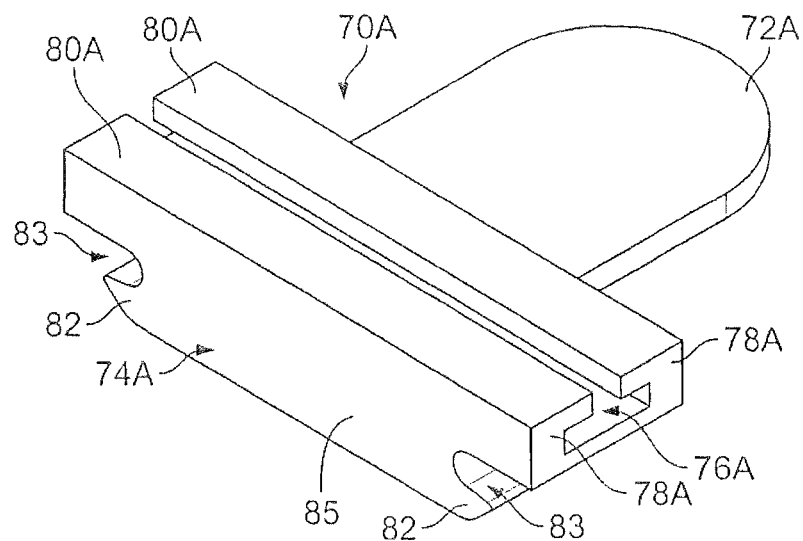
FIG. 24 is a front perspective view of an end fitting for use with the side rail shown in FIG. 22.
Figure 25:
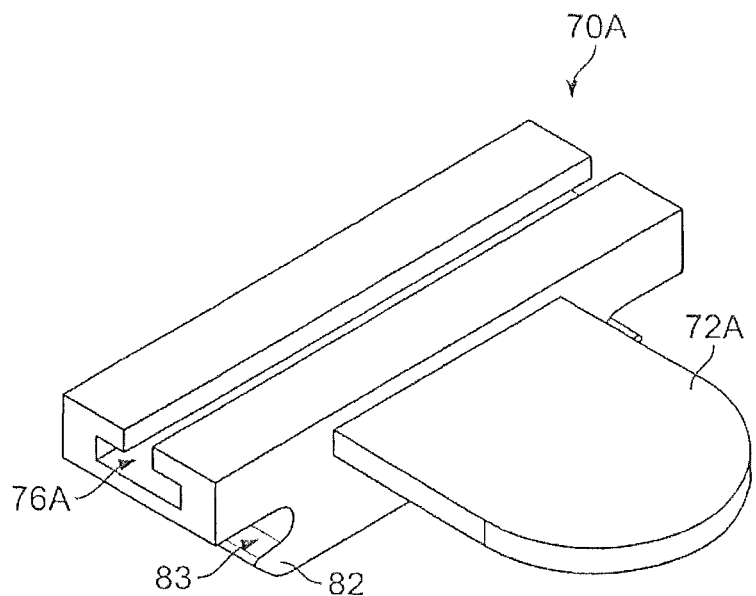
FIG. 25 is a side perspective view of the end fitting shown in FIG. 24.

It is also possible to provide the end fitting engagement element, such as the slot 83, or a projecting engagement element on the end fitting, on one side of the end fitting, instead of on the bottom as shown in FIGS. 24-25. For example, an engagement element may extend out and down from the outer side surface 85 shown in FIG. 24. In this case, the engagement element may engage a counterpart engaging element on the side rail, but with the counterpart not in the channel section 112. Specifically, the counterpart engaging element may be out of the channel section 112, to the inside of the inner channel wall 114, optionally attached to or supported by the inner channel wall 114 or the channel floor 116.

Figure 27:
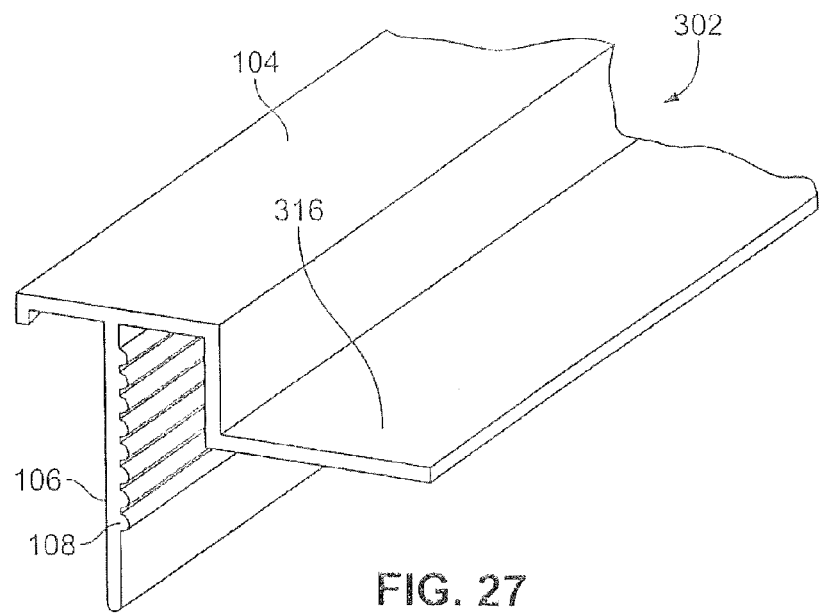
FIG. 27 is a perspective view of an alternative side rail without a drain channel.
Figure 28:
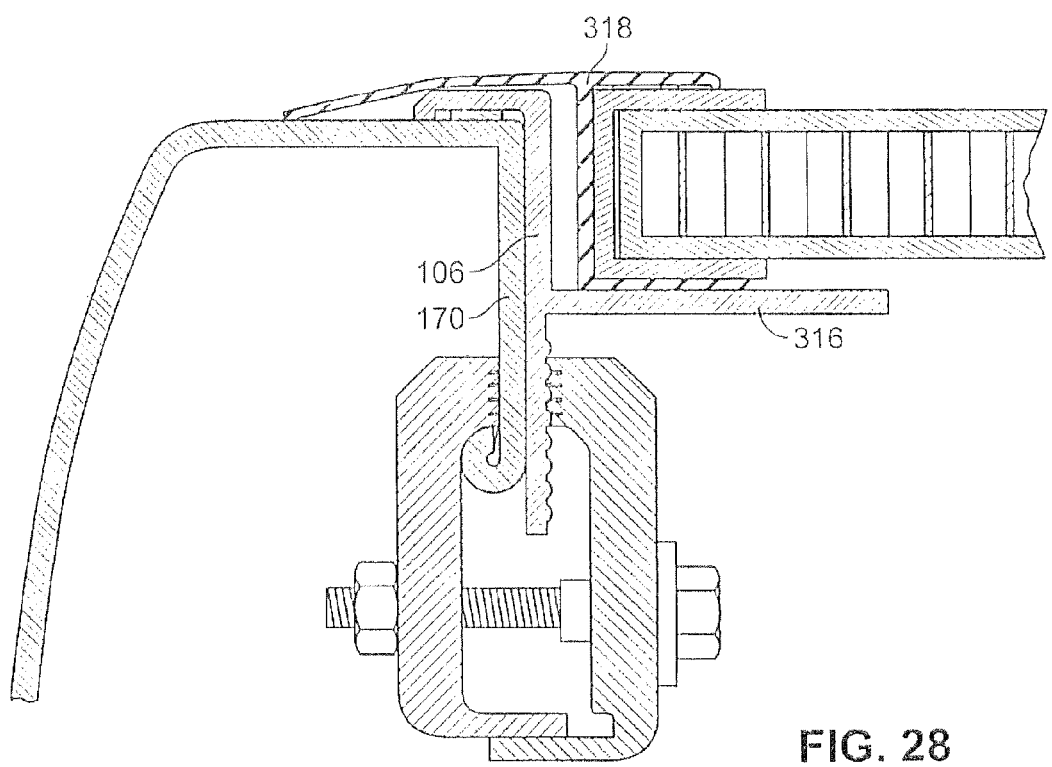
FIG. 28 is a section view showing an alternative cover on the side rail of FIG. 27.

FIGS. 27 and 28 show another design having a side rail 302 having a cover support ledge 316, a top plate 104 and a clamp plate 106, but without a drain channel. Using a continuous sheet of flexible material 34 on the slats 26 and a seal 318 as shown in FIG. 28 and as in U.S. Pat. No. 7,537,264, may provide sufficiently water tight sealing. Drain channels in the side rails may therefore be used or omitted. Eliminating the drain channel allows a simpler extrusion shape to be used for the side rails.

Although the covers 20 and 21 are described above as roll up covers, they can also fold up. As shown in FIG. 15, the gap 218 allows several slats 26 be lifted up off of the side rails, typically after releasing the latch 195. For example, if the gap 218 is 7 inches, and the slats are 1.6 inches wide, then four slats with a front to back length of 6.4 inches may be lifted together, with the four slats remaining in a flat plane. This group of four slats may then be folded over with the hinge joints 24 between the fourth, fifth and optionally sixth slats opening. A subsequent group of four (or more or fewer) slats may then also be folded over, with the folding continuing as desired. The folded cover takes on a generally oval shape, in contrast to the round shape taken when the cover is rolled up.

Figure 29:
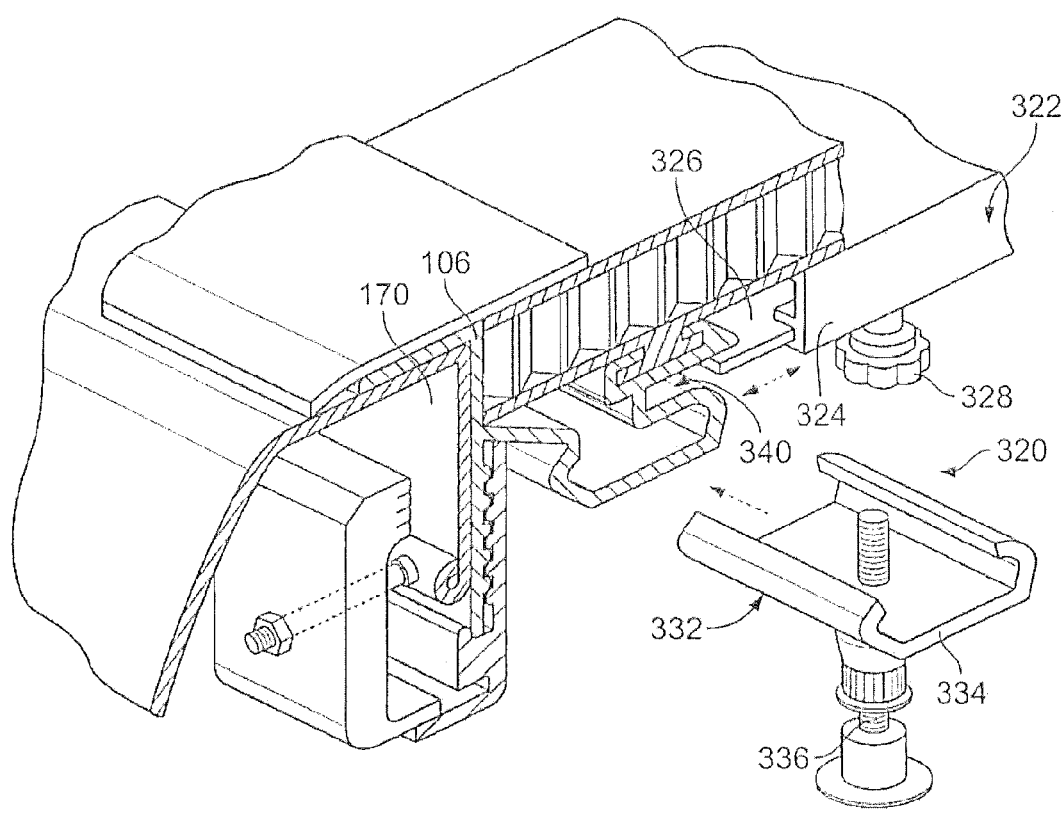
FIGS. 29 and 30 are perspective section views of an alternative design for attaching a roll-up or folding cover to side rails, without using any fasteners extending through the cover.
Figure 30:
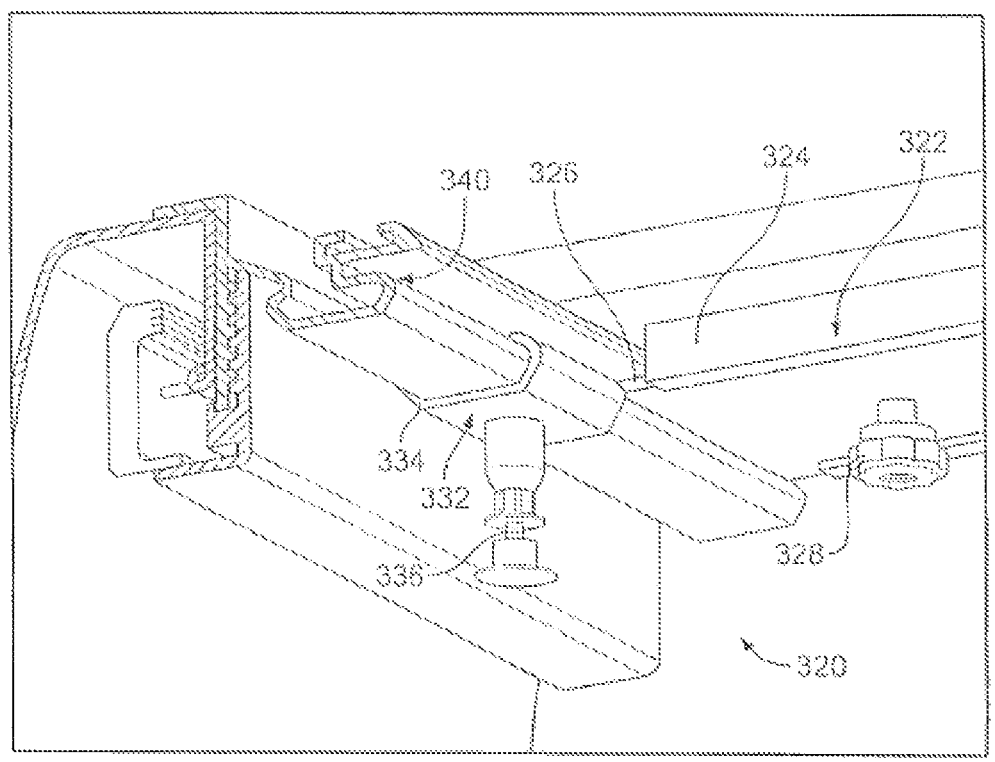

FIGS. 29 and 30 show a sliding cover clamp system 320 which may be used to attach a roll-up cover or a folding cover to side rails, without the need for any through holes in the cover. A slide housing 322 is attached to the bottom surface of a slat at the front of the cover, or to the bottom surface of a cab panel, using adhesives and/or blind fasteners that do not extend all of the way up through the cover. The slide housing 322 may be provided as a segment 324 of an extrusion. A slide plate 326 is slidable laterally in the slide housing 322. A slide plate screw 328 can be tightened to lock the slide plate 326 in an in position or an out position, and temporarily loosened to allow movement of the slide plate 326 between the in and out positions.

Also as shown in FIGS. 29 and 30, a rail clamp 332 is provided in the form of an extrusion segment 334 shaped to slide over the drain channel of the side rail. A rail clamp screw can be tightened to lock the rail clamp in place on the side rail, and loosened to allow the rail clamp 332 to slide on the side rail.

Referring still to FIGS. 29 and 30, in use the cover is placed onto the side rails. With the front slat or cab panel positioned at the front end of the side rails, the slide plate 326 on both the left and right sides of the cover is slid outwardly. The outer end of slide plate 326 moves into a slot 340, such as a latch slot, or other opening in the side rail. The clamp screw 328 is tightened to hold the slide plate in place. The slat or cab panel is consequently locked down vertically onto the side rails.

To prevent the cover from moving on the rails in the front to back direction, a rail clamp 332 slidably engaged on the side rail is slid forward until it contacts the slide plate. The rail clamp 332 is then locked in place using the rail clamp screw. The front end of the cover is then locked onto the rails against movement in any direction.

Thus, novel cover assemblies have been shown and described. Various changes and substitutions may be made without departing from the spirit and scope of the invention. The invention therefore should not be limited except by the following claims and their equivalents.

What is claimed is:

1. A cover assembly for a vehicle box, comprising:
    a plurality of slats with each slat pivotally connected to at least one adjacent slat;
    end fittings attached to opposite ends of each of the plurality of slats;
    first and second side rails attached to the vehicle box; and
    a locking element associated with each side rail movable to engage and hold the end fittings onto the side rails, the locking element including a hook on a roll rod pivotally positioned within an arc section of the side rail, the roll rod movable from a first position wherein the hook projects into a slot in the end fittings, to a second position wherein the hook is withdrawn from the slot.

2. The cover assembly of claim 1 wherein the end fittings each have a flat bottom surface supported on the side rails.

3. The cover assembly of claim 1 wherein the roll rod and the side rail are each substantially the same length and further comprising a drive plate rigidly attached to a back end of the roll rod, the drive plate rotating the roll rod when the cover is closed over the drive plate.

4. The cover assembly of claim 1 wherein the cover rolls up or folds up starting at the back end of the vehicle box.

5. The cover assembly of claim 1 wherein the slats are pivotally attached to each other to allow the cover to roll up only in a roll up direction wherein the top surfaces of the slats move towards each other, and with bottom surfaces of the slats facing outwardly, and not vice versa.

6. The cover assembly of claim 1 wherein each end fitting includes a seal slot, further comprising:
    a resilient seal having a slot section extending through the seal slots, the resilient seal having an inner arm extending over at least two of the plurality of slats, and an outer arm extending over a top surface of at least one of the first and second side rails.

7. A cover assembly for a pick-up truck box having a front end and a back end, comprising:
    a roll up cover having a plurality of slats with a first hinge element on a first side of substantially each slat pivotally attached to a second hinge element on a second side of an adjacent slat to form a pivot joint between adjacent slats;
    first and second side rails attachable to opposite sides of the truck box, each said first and second side rail having a front end positionable adjacent the front end of the pick-up truck box and a back end positionable adjacent the back end of the pick-up truck box;
    the roll up cover being rollable or foldable on the side rails starting from the back ends of the first and second side rails from a closed position to an open position;
    end fittings attached to opposite ends of at least one of the plurality of the slats and engageable with the side rails to lock the cover onto the truck box, with each end fitting having a seal slot; and
    a resilient seal having a slot section extending through the seal slots, the resilient seal having an inner arm extending over at least two of the plurality of slats, and an outer arm extending over a top surface of at least one of the first and second side rails.

8. The cover assembly of claim 7 with the first hinge element comprising a curved lip and the second hinge element comprising curved hook.

9. The cover assembly of claim 8 with the curved lip is entirely below a top surface of the cover.

10. A cover assembly for a pick-up truck box having a front end and a back end, comprising:
    a roll up cover having a plurality of slats, each of the plurality of slats having a first hinge element on a first side pivotally attached to a second hinge element on a second side of an adjacent slat to form a pivot joint between adjacent slats;
    side rails attachable to opposite sides of the truck box, each said first and second side rail having a front end positionable adjacent the front end of the pick-up truck box and a back end positionable adjacent the back end of the pick-up truck box;
    the roll up cover being rollable or foldable on the side rails starting from the back ends of the side rails from a closed position to an open position; and
    end fittings attached to opposite ends of at least one of the plurality of the slats and engageable with the side rails to lock the cover onto the truck box, each end fitting including a slot and further including a roll rod in the side rails having a hook section that moves in a circular arc into contact with the end fittings, as one or more of the plurality of slats at a back end of the cover move into the closed position.

11. The cover assembly of claim 10 wherein the end fittings each have a flat bottom surface supported on the side rails.

12. The cover assembly of claim 10 wherein the roll rod and the side rails are each substantially the same length and further comprising:
    a drive plate rigidly attached to a back end of the roll rod, the drive plate rotating the roll rod when the cover is closed over the drive plate.

13. The cover assembly of claim 10 wherein the cover rolls up or folds up starting at the back end of the truck box.

14. The cover assembly of claim 10 wherein the slats are pivotally attached to each other to allow the cover to roll up only in a roll up direction wherein the top surfaces of the plurality of slats move towards each other, and with bottom surfaces of the plurality of slats facing outwardly.

15. The cover assembly of claim 10 wherein each end fitting includes a seal slot, further comprising:
    a resilient seal having a slot section extending through the seal slots, the resilient seal having an inner arm extending over at least two of the plurality of slats, and an outer arm extending over a top surface of at least one of the side rails.

* * * * *